United States Patent
Togawa

(10) Patent No.: US 7,302,686 B2
(45) Date of Patent: Nov. 27, 2007

(54) TASK MANAGEMENT SYSTEM

(75) Inventor: Atsushi Togawa, Tokyo (JP)

(73) Assignee: Sony Corporation, Tokyo (JP)

( * ) Notice: Subject to any disclaimer, the term of this patent is extended or adjusted under 35 U.S.C. 154(b) by 826 days.

(21) Appl. No.: 10/190,203

(22) Filed: Jul. 3, 2002

(65) Prior Publication Data

US 2003/0014463 A1 Jan. 16, 2003

(30) Foreign Application Priority Data

| Jul. 4, 2001 | (JP) | ............................ 2001-203751 |
| Jul. 6, 2001 | (JP) | ............................ 2001-206814 |

(51) Int. Cl.
| G06F 9/46 | (2006.01) |
| G06F 15/16 | (2006.01) |
| G06F 15/173 | (2006.01) |
| G06F 12/00 | (2006.01) |

(52) U.S. Cl. .................. 718/103; 718/102; 709/203; 709/223; 709/224; 709/225; 710/240; 710/241; 710/244

(58) Field of Classification Search ........ 718/100–108; 711/151; 709/223–225, 203; 710/240–244
See application file for complete search history.

(56) References Cited

U.S. PATENT DOCUMENTS

| 6,301,602 B1 * | 10/2001 | Ueki ........................ 718/103 |
| 6,324,562 B1 * | 11/2001 | Inagaki et al. .............. 718/100 |
| 6,560,627 B1 * | 5/2003 | McDonald et al. ......... 718/103 |
| 6,560,628 B1 * | 5/2003 | Murata ....................... 718/103 |
| 6,732,138 B1 * | 5/2004 | Browning et al. .......... 718/102 |
| 6,751,711 B1 * | 6/2004 | de Buda ..................... 711/151 |
| 6,834,301 B1 * | 12/2004 | Hanchett .................... 709/223 |
| 6,874,144 B1 * | 3/2005 | Kush .......................... 718/103 |
| 2002/0120663 A1 * | 8/2002 | Binns ......................... 709/103 |
| 2002/0133530 A1 * | 9/2002 | Koning ....................... 709/102 |

* cited by examiner

*Primary Examiner*—Meng-Al T. An
*Assistant Examiner*—Jennifer N. To
(74) *Attorney, Agent, or Firm*—Frommer Lawrence & Haug LLP; Willaim S. Frommer; Thomas F. Presson

(57) ABSTRACT

A task management system that inherit priority and that can reduce the queue operation required for transition to/return from a mutual exclusion awaiting state The task management system can execute a task without considering its priority, start or stop a server task and inherit priority without operating the dispatch queue. The task management system includes activity retaining information, context retaining information, and a dispatch queue used to select the highest priority task. Information on a task is divided and managed by the activity and the context, where each activity is inserted into/deleted from the dispatch queue. When the priority of a task is inherited by another task, only the correspondence between activity and context is changed.

4 Claims, 14 Drawing Sheets

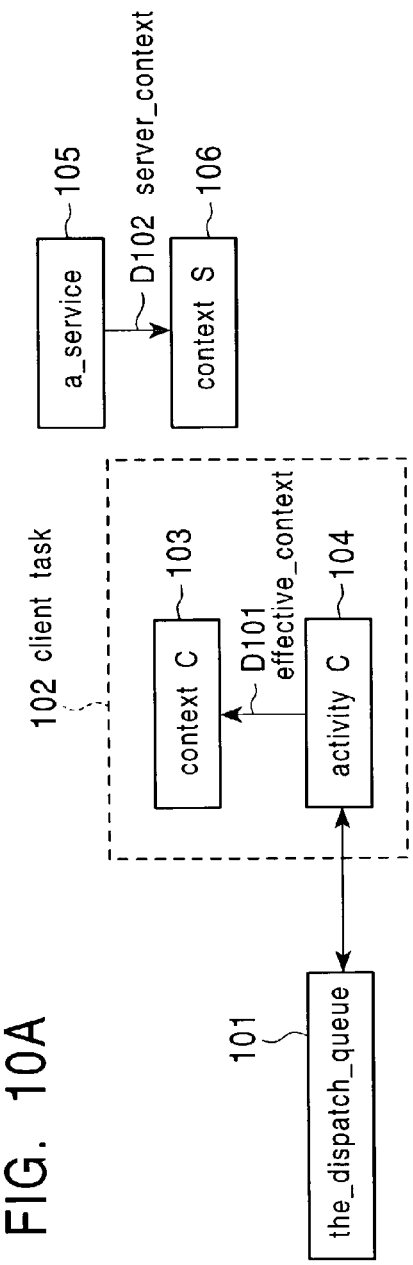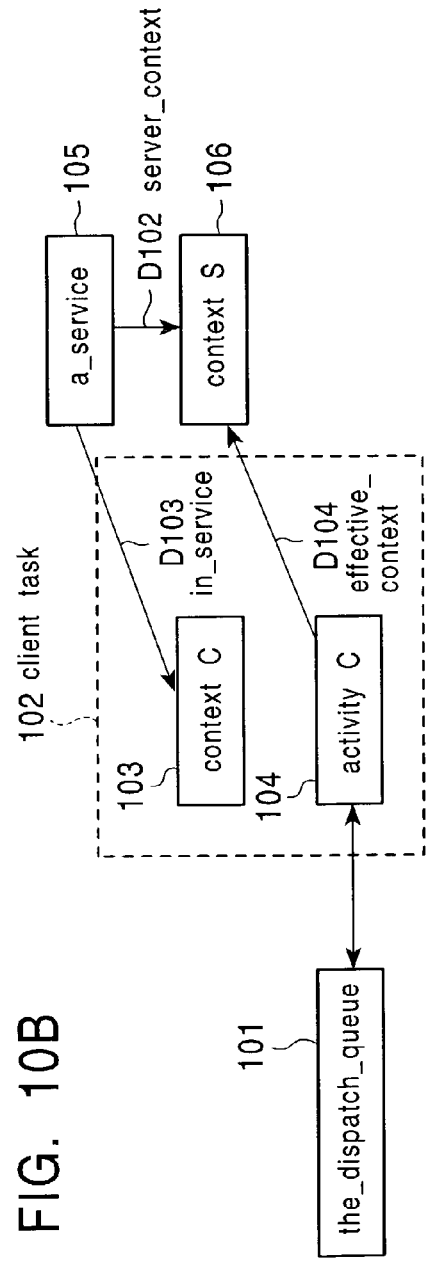

TASK MANAGEMENT SYSTEM

BACKGROUND OF THE INVENTION

1. Field of the Invention

The present invention relates to a task management system suitable for, for example, an operating system (OS).

2. Description of the Related Art

It has conventionally been one of the important aims of a real-time OS to enhance the effective use of a processor's time capable of being occupied by task execution, while guaranteeing that the upper limit of a task's response time is equal to or less than a predetermined value set as a deadline. To achieve this aim, it is possible to use the following scheduling techniques.

First, it is possible to employ superior dispatch policies.

The Earliest Deadline First (EDF) policy (reference: C. L. Liu and J. W. Layland, "Scheduling algorithms for multi-programming in a hard real time environment", Journal of ACM, Vol. 20, No. 1, pp. 46-61, 1973) is known as one dispatch policy. The EDF policy is known as one that can achieve the highest processor-use factor in techniques that perform scheduling of periodic tasks each having a period equal to that of a deadline. However, preconditions are essential, such as no interference between tasks, and the use of a single processor.

Second, it is possible to minimize the time for which a higher priority task is blocked by a lower priority task. By employing a priority inheritance protocol (reference: Lui, Sha, Raguntathan Rajkumar, and John P. Lehoczky, "Priority Inheritance Protocols: An Approach to Real-time Synchronization", IEEE Transactions on Computers, Vol. 39, No. 9, pp. 1175-1185, September 1990), the time for which the higher priority task is blocked can be reduced by using the lower priority task. Here, priority inheritance protocol is used as a generic term for a basic priority inheritance protocol and a priority ceiling protocol.

In addition, in order to realize stable system operation, in system construction, by dividing the system into a plurality of modules and executing the modules in different address spaces, one module is prevented from mistakenly destroying data of another module.

Also, in general, individual tasks cannot pass the boundary of each module. In this system, in order that one module may use a function of another module, a mechanism for calling a procedure in a different address space is provided in most situations.

In this case, whenever use of a service is attempted, processing for stopping or starting a client task and a server task must be performed. The time required for stopping or starting frequently occupies a not insignificant amount of time with respect to the total of the service time, although it depends on the time required for providing the service. This problem may be worse in a scheduler employing the EDF policy because its overhead tends to increase compared with schedulers of the related art.

Moreover, an increase in the overhead associated with a priority change of the server task must also be taken into consideration. In general, client tasks have various types of urgency. Thus, it is preferable that the server task process a request with a priority identical to client task priority.

Accordingly, when requesting a service, the server task priority is frequently changed, depending on the client task priority. An overhead generated due to this priority change or termination is added to the overhead caused by starting or stopping the server task and the client task.

The above-described scheduling technique of the related art has the following problems.

First, an EDF scheduler employing the EDF policy has an overhead larger than that in a static priority scheduler using fixed priority, which is widely used in known OSs.

Second, a scheduler employing the priority inheritance protocol has a large overhead, which indicates that execution time is that of a general case. In particular, when this scheduler is used in combination with the above EDF scheduler, the overhead is larger than that in the case of using the static priority scheduler.

These points are further described below.

One of the causes of the larger overhead in the EDF scheduler compared with the static priority scheduler is that the range of priorities that the EDF scheduler must handle is large, and as a result, it is difficult to efficiently implement a dispatch queue.

Since, in general, processing that adds a task to the dispatch queue or processing that deletes a task from the dispatch queue is executed very frequently, it is preferable that this processing be executed as efficiently as possible. Although processing that selects a highest priority task from the dispatch queue is not so frequently executed compared with the adding or removing processing, its frequency is higher.

In order to efficiently realize these two operations, a system that performs static priority scheduling, in many cases, implements the dispatch queue by using the data configuration shown in FIG. 9. In this implementation, one element of the elements 1 to n of an array is assigned to each priority 91. This element is used as the start point of a bidirectional link list of tasks having the same priority. In the bit stream 92 at the bottom left of FIG. 9, the 1's indicates that tasks 93 to 95 are linked to the bidirectional link list and that tasks 96 and 97 are also linked to the bidirectional link list.

In this data configuration, the task adding processing and the task deleting processing can be executed in a constant time that is short in practice. Also, the processing that selects the highest priority task can be executed by calculating the position in which the first "1" appears in the bit stream 92. This is a case in which, when there is a task linked to the bidirectional link list, "1" is stored in the bit stream 92. When "1" is stored, the first "0" must be found. When the static priority scheduler is used, 256, or slightly less is common as a possible range of priorities. Accordingly, the time required for the calculation does not become a problem in practical use. An array for the start point of the bidirectional link list and the size of the bit stream are also sufficiently small.

On the contrary, when the EDF scheduling is used, the whole possible range of times must be used. Here, a technique that correlates a time with a value having a smaller possible range has also been proposed. This, however, has a possibility that processing for sorting the priorities of many tasks may occur in the operating time of the system. Accordingly, a technique that performs efficient processing on a wider range of priorities is required.

Regarding this type of technique, a linear list, a heap, a splay tree, a calendar queue (reference: Randy Brown, "Calendar Queues: A Fast (1) Priority Queue Implementation for the Simulation Event Set Problem", Volume 31, November 10, Communications of the ACM, October 1988), etc., are known.

The performance achievable by the data configurations of the above techniques is lower than that achievable by the data configuration shown in FIG. 9. Accordingly, it is difficult for a system employing EDF scheduling to reduce the cost required for the dispatch queue operation.

One of the reasons why mutual exclusion (mutex) for preventing two tasks employing the priority inheritance protocol from simultaneously being executed has an overhead larger than that of ordinary mutex is that the priority changes due to priority inheritance. In general, when the priority of a task changes, some operation must be performed for the dispatch queue. This particularly becomes a problem in the case of the EDF scheduler, in which the cost required for the operation is large.

In addition to the above-described factor, the overhead of the priority inheritance protocol includes overhead generated by performing queuing in which tasks having mutex are controlled to queue in the order of priority. Also, when employing the priority ceiling protocol that stores information on which mutex is locked, whenever the mutex lock operation is performed, mutexes that are locked by other tasks must be searched in order to find one in which the maximum ceiling value is set.

Although the EDF scheduling and the priority inheritance protocol have superior characteristics, they tend to have a larger overhead than in cases where they are not employed.

Third, when the server task priority is changed for a service request in accordance with the client task priority, the overhead generated due to the priority change or termination is added to the overhead generated by starting or stopping the server task and the client task. Thus, the overhead increases even more.

SUMMARY OF THE INVENTION

Accordingly, the present invention is made in view of the above problems, and it is an object of the present invention to provide a task management system in which, to reduce overhead, priority is inherited without operating a dispatch queue, in which the number of times the queue operation required for transition or return to a mutex-awaiting state is performed is greatly reduced, and in which a mutex awaiting queue can be operated without considering priority.

It is another object of the present invention to provide a task management system in which a server task is started or stopped without operating a dispatch queue and in which priority is inherited without operating the dispatch queue.

To these ends, according to an aspect of the present invention, a task management system using a single processor to manage tasks is provided. The task management system includes a first data block retaining information on scheduling of the managed tasks which is included in information on arbitrary tasks, a second data block retaining information which is not recorded in the first data block, and a third data block for selecting the highest priority task from among executable tasks. Information on one task is divisionally managed by the first data block and the second data block. The first data block is used as a data block to be inserted into or deleted from the third data block. When priority inheritance from one task to another task is performed, only the correspondence between the first data block and the second data block is changed.

According to the present invention, first, by performing priority inheritance without operating first and third blocks, a high overhead of the EDF scheduling which is due to the operation of the third data block can be avoided, and at the same time, an overhead of a priority inheritance protocol can be reduced.

Second, by reducing the number of times the queue operation required for transition to or return from the mutual exclusion state, a high overhead of the EDF scheduling which is due to the operation of the third data block can be relaxed.

Third, by performing a mutual exclusion awaiting queue operation without considering priority, one of causes of the overhead of the priority inheritance protocol can be eliminated.

As a result, an advantage is obtained in that a higher processor-use factor can be achieved while suppressing an increase in the overhead due to the employment of the EDF scheduling and the priority inheritance protocol.

Preferably, even when task execution must be stopped based on one condition variable for performing the priority inheritance, an operation for the third data block is delayed until the time the task execution must be stopped based on another condition variable without immediately performing the operation for the third data block.

Thus, when a task possesses mutual exclusion, transition of the task to a waiting state hardly occurs due to a factor other than mutual exclusion, so that not only the need for the queue operation required for priority change can be eliminated, but also the need for the queue operation required for mutual exclusion can be eliminated in many cases.

According to another aspect of the present invention, a task management system using a single processor to manage tasks is provided. The task management system includes a first data block retaining information on scheduling of the managed tasks which is included in information on an arbitrary task, a second data block retaining information which is not recorded in the first data block, a third data block for selecting the highest priority task from among executable tasks, a server task in one module which is started by a service request from a task operating in another module and which processes the service request, and a client task for issuing a service request to the server task. Information on one task is divisionally managed by the first data block and the second data block. The first data block is used as a data block to be inserted into or deleted from the third data block. The server task is a particular task having no first data block thereof. When the server task and the client task are started or terminated, and when priority inheritance from one task to another task is performed, only the correspondence between the first data block and the second data block is changed.

According to the present invention, first, by starting or terminating a server task without operating first and third data blocks, a high overhead of the EDF scheduling which is due to the operation of the third data block can be avoided.

Second, a server task can inherit the priority of a client task without operating the third block. As a result, advantages are obtained in that a highly stable system can be formed and a higher processor-use factor can be achieved while suppressing an increase in the overhead due to the starting of the server task which needs the EDF scheduling and the priority inheritance.

Preferably, even when the client task stops to await the service request from the server task, an operation for the third data block is delayed until the time the task management system finds that the client task is mistakenly selected from the third data block without immediately deleting the client task from the third data block.

Accordingly, an advantage is obtained in that the number of times the third data block is operated for terminating or starting of the client task can be reduced.

BRIEF DESCRIPTION OF THE DRAWINGS

FIGS. 2A and 2B are block diagrams showing changes caused by priority inheritance in relationships between context and activity, in which FIG. 2A shows the relationship before the priority inheritance and FIG. 2B shows the relationship after the priority inheritance;

FIGS. 3A and 3b are block diagrams showing moving processes in a waiting queue which are performed when priority inheritance is performed, in which FIG. 3A shows a relationship before priority inheritance and FIG. 3B shows a relationship after priority inheritance;

FIGS. 10A and 10B are block diagrams showing changes due to server start in relationships between context and activity, in which FIG. 10A shows the relationship before the server start, and FIG. 10B shows the relationship after the server start;

DESCRIPTION OF THE PREFERRED EMBODIMENTS

First Embodiment

Embodiments of the present invention are described below with reference to the accompanying drawings.

A task management system according to a first embodiment of the present invention can efficiently realize an exclusive control mechanism employing a priority inheritance protocol, compared with the technique of the related art.

Figure 1:
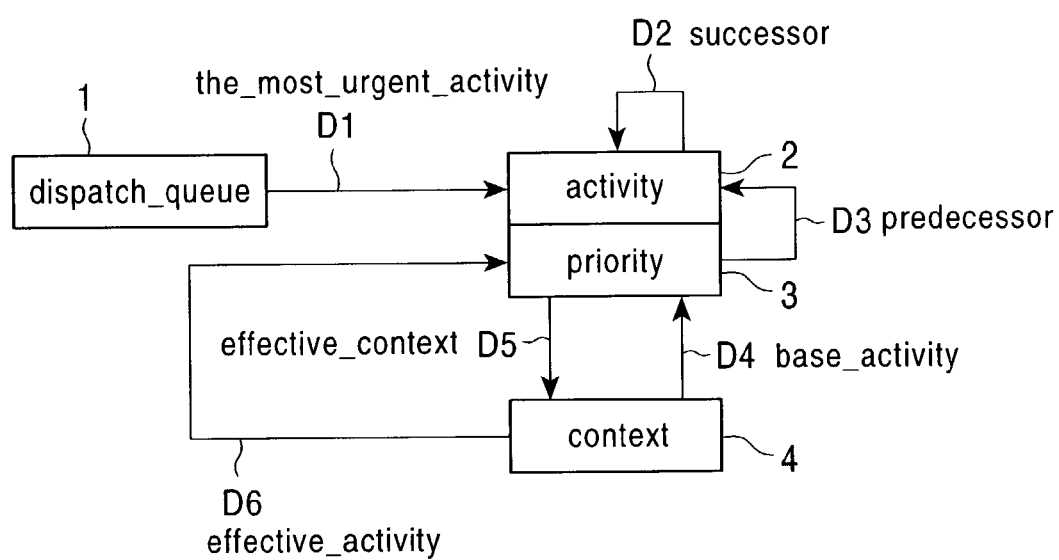
FIG. 1 is a block diagram showing context and activity which are applied to a first embodiment of the present invention.

FIG. 1 shows context and activity applied to the first embodiment of the present invention.

When the technique of the related art is used to inherit priority, the following two processes are performed. First, task priority is changed. Second, when tasks are linked to a dispatch queue, a process that moves the tasks to appropriate positions in the order of the changed priority is performed.

In the first embodiment, to simplify these processes, information that must be inherited is separated from other information, and these pieces of information are treated as one to be inserted into or deleted from "dispatch_queue" 1. Specifically, as shown in FIG. 1, one task is represented by "activity" 2 that is a data configuration retaining priority, and "context" 4 that is a data configuration retaining other information. "Activity" 2 is treated as one to be inserted into or deleted from "dispatch_queue" 1.

In FIG. 1, "dispatch_queue" 1 performs the most urgent correlation D1 (the_most_urgent_activity) based on the priority for "activity" 2.

"Activity" 2 performs, for itself, correlation D2 (successor) with the rear part of the array, and "priority" 3 performs correlation (predecessor) with the front part of the array for "activity" 2.

"Context" 4 performs, for "activity" 2, original correlation D4 (base_activity) that is free from the priority 3 (priority). "Activity" 2 performs presently effective correlation D5 (effective_context) for "context" 4.

"Context" 4 performs presently effective correlation D6 (effective_activity) for "activity" 2.

The division enables priority inheritance by only changing the correspondence between "context" 4 and "activity" 2.

Figure 2A:
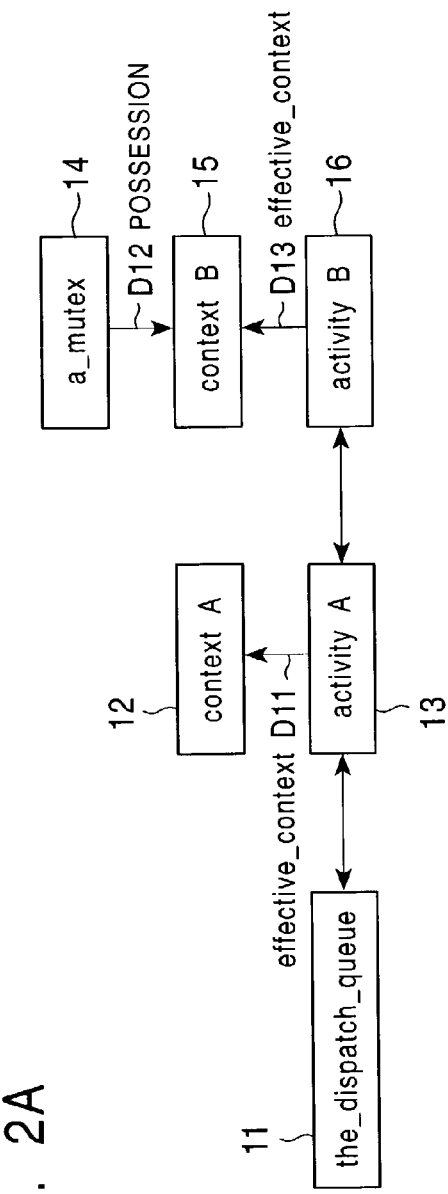
Figure 2B:
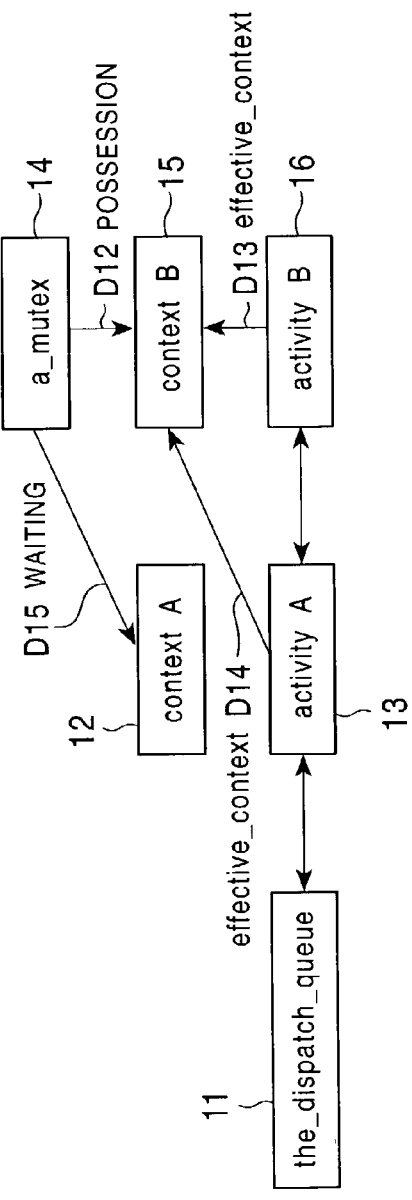

FIGS. 2A and 2B show changes in the correspondence between "context" 4 and "activity" 2 due to priority inheritance. FIGS. 2A and 2B show that the correspondence between "context" 4 and "activity" 2 changes before (FIG. 2A) and after (FIG. 2B) priority inheritance. Here, this data configuration is called "the_dispatch_queue" because what must be queued is activity, and non-executing pieces of activity are queued, as described later.

As is clear from FIGS. 2A and 2B, the positional relationship in "the_dispatch_queue" 11 of "activity A" 13 and "activity B" 16 does not change. Only the relationship of "activity A" 13, "context A" 12, and "context B" 15 changes.

By simply performing an operation in which presently effective correlation D11 (effective_context), which indicates one pointer from "activity A" 13 to the context 12 (context) is updated to presently effective correlation D14 (effective_context), which indicates one pointer from "activity A" 13 to "context" 12, a process equivalent to moving is performed.

The technique of the related art deletes "activity" 13 from "the_dispatch_queue" 11, while the technique of the first embodiment controls "activity" 13 to remain in "the_dispatch_queue" 11. This omission in this process can be performed by delayed dequeuing (described later).

Here, determination of change in the correspondence of both is performed by "context B" 15, which is the owner of "a_mutex" 14, and "context B" 15 recognizes the change in the correspondence.

In FIG. 2A, "activity A" 13 performs the presently effective correlation D11 (effective_context) for "context A" 12.

"Activity B" 16 performs presently effective correlation 13 (effective_context) for "context B" 15.

"A_mutex" 14 performs possession correlation D12 for "context B" 15.

In FIG. 2B, "activity A" 13 performs presently effective correlation D14 (effective_context) for "context B" 15.

"A_mutex" 14 performs waiting correlation D15 for "context A" 12.

"Activity B" 16 performs presently effective correlation D15 (effective_context) for "context B" 15.

"A_mutex" 14 performs possession correlation D12 for "context B" 15

As described above, even when the transition of the task to the waiting state has occurred due to "a_mutex" 14, it is not necessary to perform immediate elimination of "activity A" 13 and "activity B" 16 from "the_dispatch_queue" 11.

In the state shown in FIGS. 2A and 2B, the process of elimination from "the_dispatch_queue" 11 can be delayed until the possibility that "activity B" 16 may be selected as one to be dispatched occurs by controlling "activity B" 16 to remain in "the_dispatch_queue" 11.

Here, to delay the process of eliminating "activity B" 16 from "the_dispatch_queue" 11 is called "delayed dequeuing". In addition, the waiting state caused by "a_mutex" 14 and a waiting state caused by other factors are distinguished from each other. The waiting state caused by other factors is called "sleeping state".

The function of the delayed dequeuing delays the process of eliminating a task from "the_dispatch_queue" 11 until transition to the sleeping state occurs. In this embodiment, until transition of "context B" 15 occurs, the process of eliminating "activity A" 13 and "activity B" 16 from "the_dispatch_queue" 11 is delayed.

By way of example, when transition of "activity A" 13 (FIG. 2B) to the sleeping state occurs after "activity A" 13 is inherited, "activity B" 16, which performs the original correlation in which "context B" 15 is not related to priority, and "activity A" 13, which performs the original correlation in which all contexts directly or indirectly blocked by "context B" 15 are not related to priority, are deleted from "the_dispatch_queue" 11.

Also, when another task attempts to obtain "a_mutex" 14 possessed by the task in the sleeping state, this task is also treated as one to be processed by the delayed dequeuing.

In general, it is uncommon that a factor other than "a_mutex" 14 causes a task to change to the waiting state while the task maintains possession of "a_mutex" 14. Accordingly, in many cases, not only the need to perform a queue operation for priority change is eliminated, but the need to perform a queue operation for awaiting "a_mutex" 14 is also eliminated.

As described above, performing an operation so that tasks are arranged in the queue awaiting "a_mutex" 14 in the order of priority is one reason that "a_mutex" 14 employing the priority inheritance protocol is more inefficient than mutex that does not employ the priority inheritance protocol. Accordingly, the first embodiment proposes a technique in which, by operating the queue in last-in-fast-out (LIFO) order, effects equivalent to those in the priority queuing are obtained.

To obtain the effects equivalent to those by the priority queuing operation by performing the LIFO-order queue operation, it is only necessary to guarantee that the following conditions to be satisfied: First, the priority order is unchanged; Second, the number of processors is one.

In other words, the first condition indicates that the priority of a task linked to a queue indicating a permutation exceeds the priority of a task to be newly inserted in the queue.

It is only when the first condition is not satisfied that the owner of "a_mutex" 14 is in the waiting state when obtaining "a_mutex" 14. In this case, inheritance of priority by the owner may cause the position of this owner in the queue awaiting "a_mutex" 14 to be inappropriate. Also, even when the original owner of "a_mutex" 14 possessed by the above owner is in the waiting state, a similar discussion holds.

However, it is clear that the priority inherited by the owner is higher than the priority of another task. Thus, by performing a process for moving this owner to the start of the queue awaiting "a_mutex", the above conditions can be satisfied.

Figure 3A:
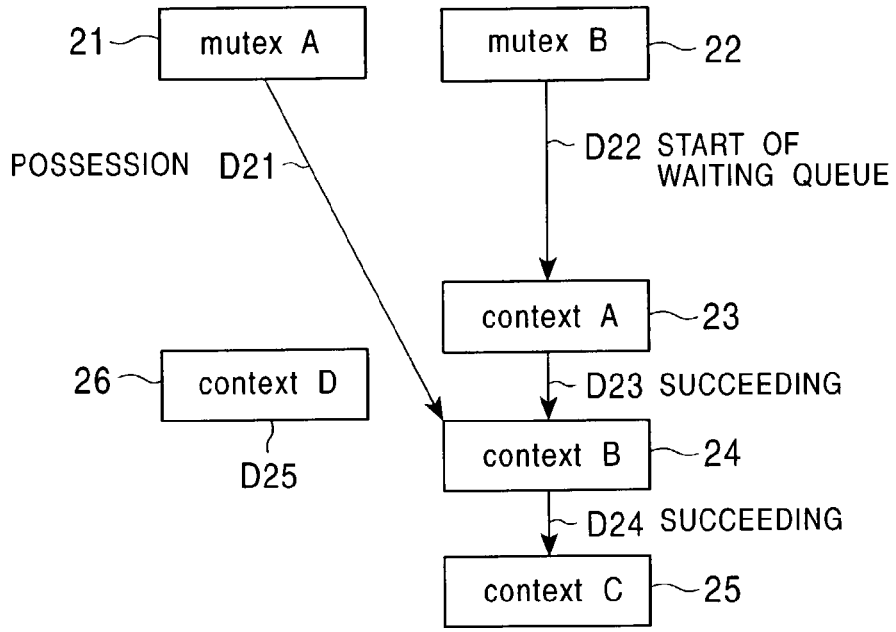
Figure 3B:
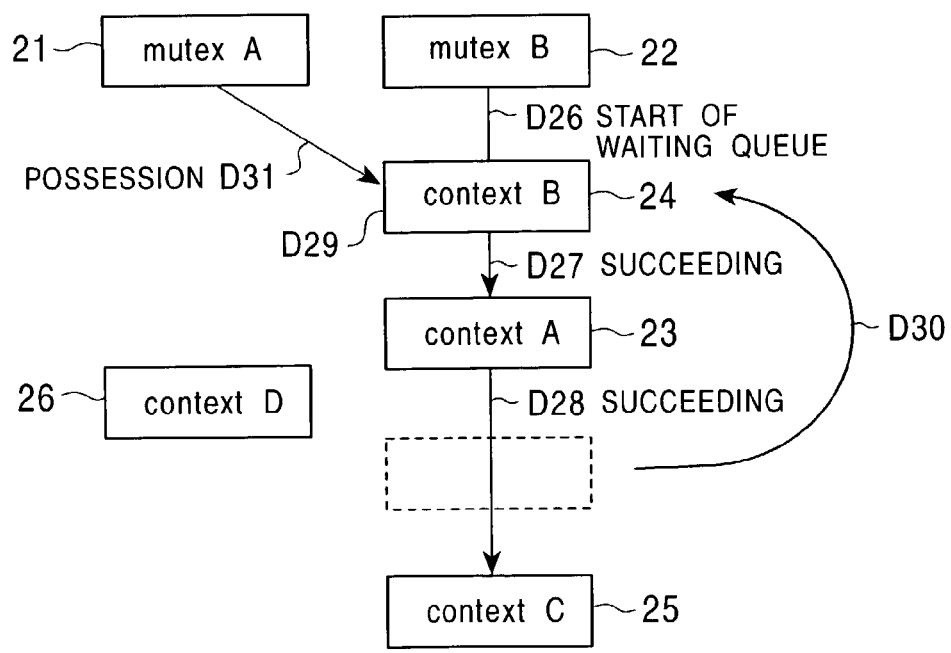

FIGS. 3A and 3B show an in-waiting-queue moving process performed when priority is inherited. FIG. 3A shows the state before the priority is inherited, and FIG. 3B shows the state after the priority is inherited.

Referring to FIG. 3A, "context A" 23, "context B" 24, and "context C" 25 are linked to a waiting queue of "mutex B" 22.

"Context B" 24 possesses "mutex A" 21.

At this time, if "context D" 26 attempts to obtain "mutex A" 21, the priority of "context D" 26 is inherited to "context B" 24, as shown in FIG. 3B. As a result, "context B" 24 moves to the start of the waiting queue.

In FIG. 3A, "mutex A" 21 performs possession correlation D21 for "context B" 24.

"Mutex B" 22 performs correlation D22 with the start of a waiting queue for "context A" 23. "Context A" 23 performs succeeding correlation D23 for "context B" 24. "Context B" 24 performs succeeding correlation D24 for "context C" 25.

As denoted by D25, "context D" 26 attempts to possess "mutex A" 21.

Referring to 3B, "mutex B" 22 performs, for "context B" 24, correlation D26 with the start of a waiting queue. "Context B" 24 performs succeeding correlation D27 for "context A" 23. "Context C" 23 performs succeeding correlation D28 for "context C" 25.

As denoted by D29, "context B" 24 inherits the priority of "context D" 26. As denoted by D30, "context B" 24 and "context A" 23 are reversed in position.

"Mutex A" 21 performs possession correlation D31 for "context B" 24.

Each of the possession correlation D21 (FIG. 3A) and the possession correlation D1 (FIG. 3B) is performed by setting an ownership class (described later) in "the_ownership" of mutex.

In FIG. 3B, also for "mutex C" (not shown) in parallel with "mutex B" 22, a similar in-waiting-queue moving process in priority inheritance is performed.

Figure 4:
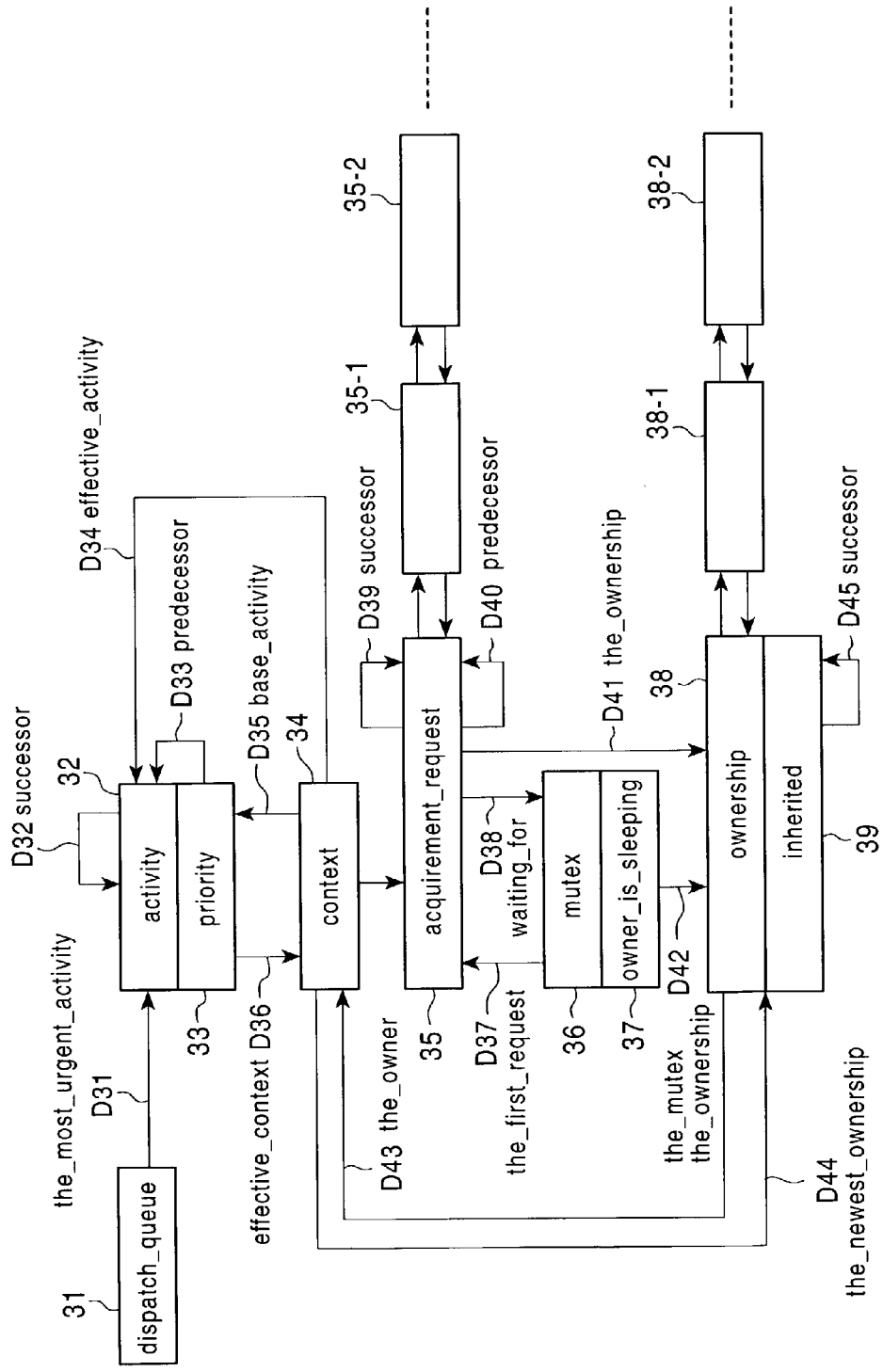
FIG. 4 is a block diagram showing classes related to the realization of a mutex mechanism and relationships among the classes.

FIG. 4 shows classes relating to the realization of a mutex mechanism and correspondences between classes.

In FIG. 4, dispatch queue 31 (dispatch_queue), "activity" 32, and "context 34" are as described above.

Here, three other classes are described below. The three classes each have the following functions.

First, a mutex class 36 (mutex) is described.

The mutex class 36 (mutex) represents mutex. An owner_is_sleeping attribute 37 is true when a task that possesses the mutex is treated as one to be processed by dispatch queue, and is false in the other cases.

Second, an acquirement_request class 35 is described.

The acquirement_request class 35 represents a mutex-acquiring request. Although one task attempts to acquire mutex, when another task has already possessed the mutex, this object is generated. After that, when acquisition is a success, this object is abandoned.

Third, an ownership class 38 is described.

The ownership class 38 represents possession of mutex. The ownership class 38 continues to exist during possession to release of mutex by one task. An inherited attribute 39 is true when a task corresponding to an ownership object, which indicates indicating ownership inherits the priority of another task, and is false if the task does not inherit the priority.

Next, relationships between objects are described.

The above classes do not independently operate, but retain, for example, the_first_request as correlation of reference to an object in another class, as shown in FIG. 4. The shown references are required for forming the following data configurations.

First, a mutex awaiting queue is described.

When one task attempts to possess "mutex" 36, if another task has already possessed "mutex" 36, the one task must wait for the owner of "mutex" 36 to release it. The mutex awaiting queue is a data configuration in which the task that must wait is recorded. The mutex awaiting queue is formed as a bidirectional link list including the acquirement_request class 35 as an element.

Correlation D37 (the_first_request) of the first request of the object "mutex" 36" indicates the element at the start.

Array-rear-part correlation D39 (successor) of the object "the acquirement_request class 35" is a pointer for succeeding elements 35-1, 35-2, etc. Array-front-part correlation D40 (predecessor) is a pointer for preceding elements 35-1, 35-2, etc. The correlation D40 (predecessor) of the start element 35 and the correlation D39 (successor) of the end element 35-n each retain a special pointer value that any object does not represent. When packaging using a language such as C or C++, a null pointer can be used therefor.

Second, a possession object queue is described.

The possession object queue is used to record mutex 36 possessed by a task. In this queue, ownership objects 38, 38-1, 38-2, etc., which are ownership that the task stores, are arranged in order of newness. The newest ownership 38 is obtained by referring to correlation D44 of the newest ownership (the_newest_ownership) of "context" 34.

The succeeding objects 38-1, 38-2, etc., are obtained by referring to array-rear-part correlation D45 (successor) of the ownership object 38. The array-rear-part correlation D45 (successor) of the ownership object 38-n stores a special pointer value that any object represents.

In FIG. 4, "the_dispatch_queue" 31 performs the most urgent correlation D31 (the_most_urgent_activity) based on priority for "activity" 32.

"Activity" 32 performs correlation of itself the rear part of the array. Priority 33 performs array-front-part correlation for "activity" 32.

"Context" 34 performs, for "activity" 32, original correlation that is not related to the priority 33. "Activity" 32 performs presently effective correlation D36 (effective_context) for "context" 34.

"Context" 34 performs presently effective correlation D34 (effective_activity) for "activity" 32.

The mutex class 36 performs correlation D37 (the_first_request) on the first request for the acquirement request class 35 (acquirement_request).

The acquirement request class 35 (acquirement_request) performs "waiting_for" correlation D38 (for the mutex class 36.

The acquirement request class 35 (acquirement_request) performs array-rear-part correlation D39 (successor) for the elements 35-1, 35-2, etc. The acquirement request class 35 (acquirement_request) performs array-front-part correlation D40 (predecessor) for the elements 35-1, 35-2, etc.

The acquirement request class 35 (acquirement_request) performs ownership correlation D41 (the_ownership) for the ownership class 38.

The mutex class 36 performs correlation D42 (the_mutex_the_ownership) on mutex ownership for the ownership class 38.

The ownership class 38 performs owner-related correlation D43 for "context" 34. "Context" 34 performs newest-ownership correlation D44 (the_newest_ownership) for the ownership class 38 (ownership).

The ownership class 38 performs array-rear-part correlation D45 (successor) for the elements 38-1, 38-2, etc.

Next, a lock operation for indicating the possession of mutex, an unlock operation for indicating release of mutex, the above-described delayed dequeuing operation, and an operation for return from the delayed dequeuing are described below.

Figure 5:
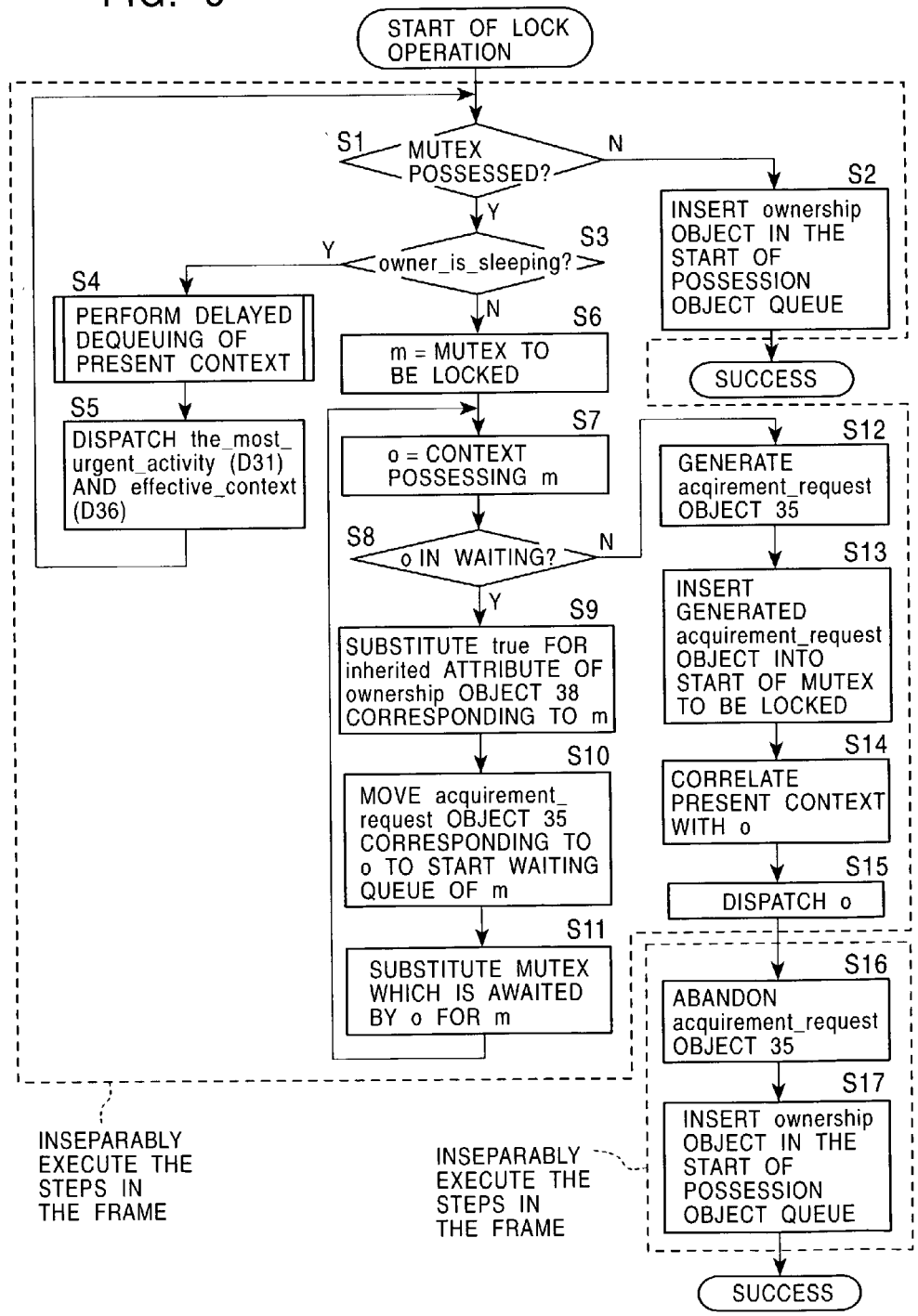
FIG. 5 is a flowchart showing the process of a lock operation.

FIG. 5 is a flowchart showing the process of the lock operation. The process of the lock operation in FIG. 5 indicates the operation of the mutex.

In FIG. 5, in step S1, the process determines whether mutex is possessed. If the process has determined negatively, the process proceeds to step S2. In step S2, by inserting an ownership object in the start of a possession object queue, the lock operation becomes a success.

In step S1, if the process has determined that the mutex is possessed, the process proceeds to step S3. In step S3, the process determines whether the owner is in the sleeping state (owner_is_sleeping).

In step S3, it the process has determined that the owner is in the sleeping state (owner_is_sleeping), the process proceeds to step S4. In step S4, the process performs delayed dequeuing of the present context.

In step S5, the process dispatches the most urgent correlation D31 (the_most_urgent_activity) based on priority, and the presently effective correlation D36 (effective_context) for "context" 34, and returns to step S1.

Specifically, the determination in step S3 and the processes in steps S4 and S5 correspond to the description of FIG. 4. After the state of the present context is retained, by using higher priority activity to switch the present context, context is captured and dispatch is executed by the processor. This state is stored in the present context.

In step S3, if the process has determined that the owner is not in the sleeping state, the process proceeds to step S6. In step S6, the process performs setting of m=mutex to be locked. In step s7, the process performs setting of o=context that possesses m.

In step S8, the process determines whether o is in the waiting state. If the process has determined in step S8 that o is in the waiting state, the process proceeds to step S9. In step S9, the process substitutes the information "true" for the inherited attribute 39 of the ownership object 38 corresponding to m.

In step S10, the process moves, to the start of the waiting queue, the acquirement request object 35 (acquirement_request) corresponding to o. In step S11, the process substitutes mutex which is awaited by o for m, and returns to step S7. The determination in step S8 and the processes in steps 9 to 11 correspond to the description of FIG. 3.

In step S8, if the process has determined that o is not in the waiting state, the process proceeds to step S12. In step S12, the acquirement request object 35 (acquirement_request) is generated.

In step S13, the generated acquirement request object 35 (acquirement_request) is inserted in the start of the waiting queue of mutex to be locked. In step S14, o is correlated with the present context. In step S15, o is dispatched.

Specifically, the execution of the present context is stopped. After that, o is used as the present context.

In step S16, the acquirement request object 35 (acquirement_request) is abandoned. In step S17, by inserting the ownership object (ownership) in the start of the possession object queue, the lock operation becomes a success.

Figure 6:
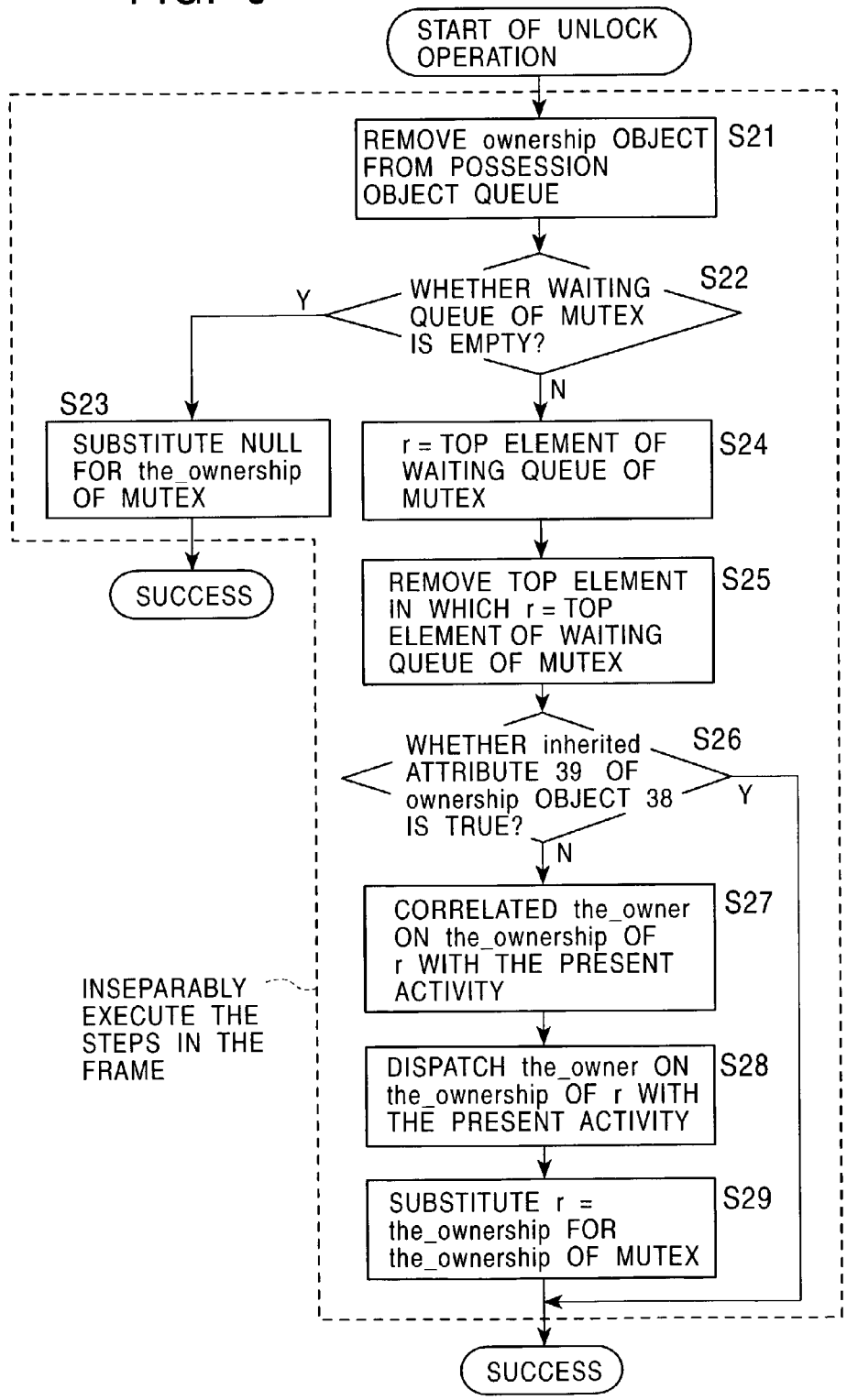
FIG. 6 is a flowchart showing the process of an unlock operation.

FIG. 6 is a flowchart showing the process of the unlock operation.

In FIG. 6, in step S21, the ownership object (ownership) is removed from the possession object queue.

In step S22, the process determines whether the waiting queue of mutex is empty. If the process has determined that the waiting queue of mutex is empty, the process proceeds to step S23. In step S23, by substituting NULL for the ownership (the_ownership) of mutex, the unlock operation becomes a success.

The process has determined in step S22 that the waiting queue of mutex is not empty, the process proceeds to step S24. In step S24, setting of r=the top element of the waiting queue of mutex is performed. In step S25, the top element in r=the top element of the waiting queue of mutex is removed.

In step S26, the process determines whether the inherited attribute 39 of the ownership object 38 (ownership) is true. In step S26, if it is determined that the inherited attribute 39 of the ownership object 38 (ownership) is true, the unlock operation immediately becomes a success.

If it is determined in step S26 that the inherited attribute 39 of the ownership object 38 (ownership) is not true, the process proceeds to step S27. In step S27, the owner (the_owner) on the ownership (the_ownership) of r is correlated with the present activity.

Specifically, correlation with awaited context is performed from the top, with the activity unchanged.

In step S28, the owner (the_owner) on the ownership (the_ownership) of r is dispatched.

In step S29, by inserting r=the ownership (the_ownership) for the ownership (the_ownership) of mutex, the unlock operation becomes a success.

Figure 7:
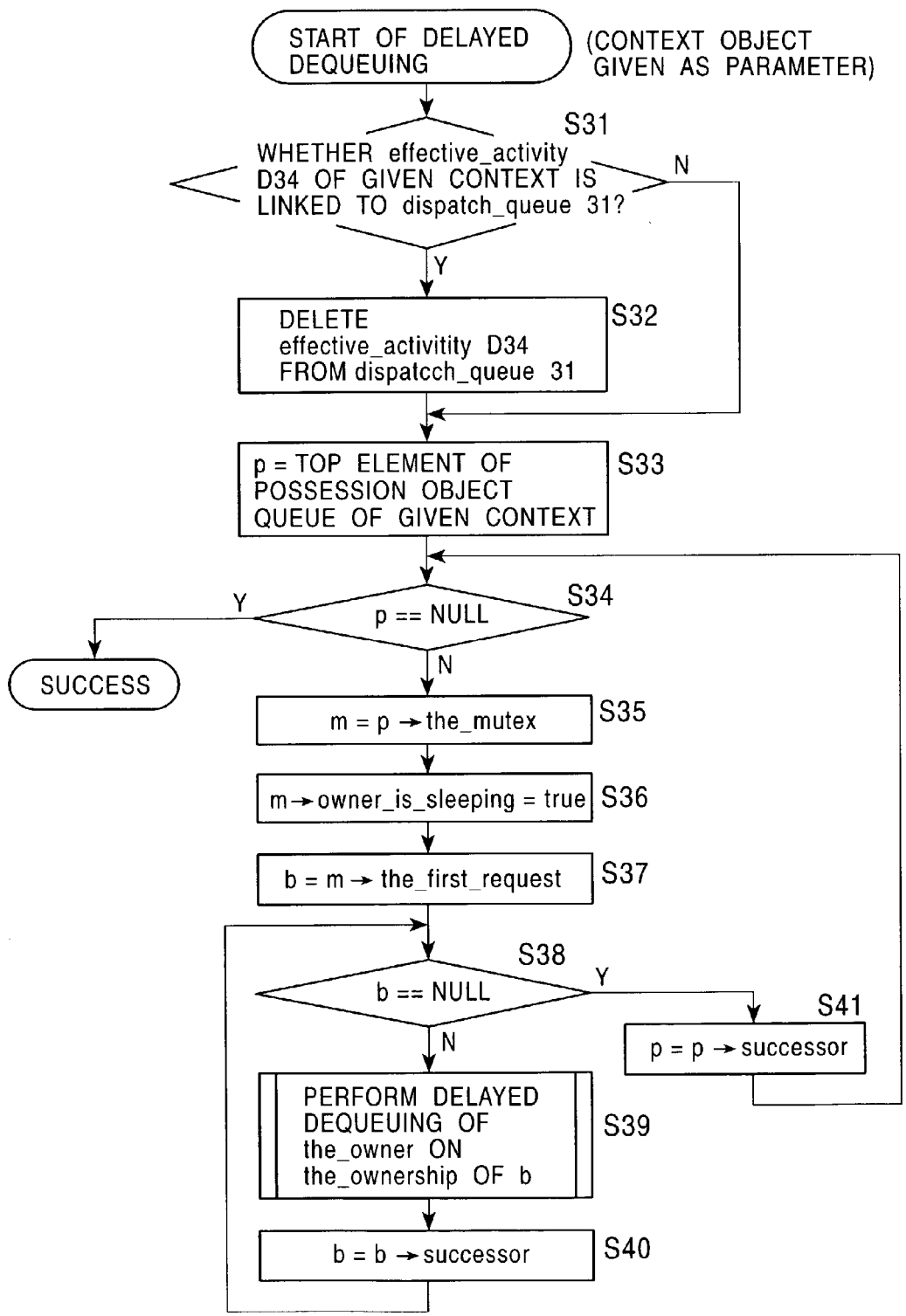
FIG. 7 is a flowchart showing the process of delayed dequeuing.

FIG. 7 is a flowchart showing the delayed dequeuing process. FIG. 7 shows the operation of mutex. The context object (context) is given as a parameter. The process in FIG. 7 is read from, for example, a sleep primitive.

In FIG. 7, in step S31, the process determines whether the presently effective correlation D34 (effective_activity) of the given "context 34" is linked to "dispatch_queue" 31.

When the presently effective correlation D34 (effective_activity) of the given "context 34" is linked to the dispatch queue 31 (dispatch_queue), the process proceeds to step S32. In step S32, the presently effective correlation D34 (effective_activity) is deleted from "dispatch_queue" 31.

In step S33, the setting of p=the top element of the possession object queue of the given "context 34" is performed. If the process has determined in step S31 that the presently effective correlation D34 (effective_activity) of the given "context 34" is not linked to "dispatch_queue" 31, the process directly proceeds to step S33.

In step S34, the process determines whether p=NULL. If it is determined that p=NULL, the delayed dequeuing directly becomes a success. In step 34, if it is determined that p≠NULL, the process proceeds to step S35. In step S35, the mutex is set with m=p. In step S36, the process sets the sleeping state (owner_is_sleeping) of the owner of m to be true. In step S37, the correlation D37 (the_first_request) is set with b=m.

In step S38, the process determines whether b=NULL. If b=NULL, the process proceeds to step S41. In step S41, the process returns to step S34 for the successor of p=p.

If b≠NULL in step S38, the process proceeds to step S39. In step S39, the process performs delayed dequeuing of the owner (the_owner) on the ownership (the_ownership) of b. In step S40, the process proceeds to step S38 for the successor of b=b.

Figure 8:
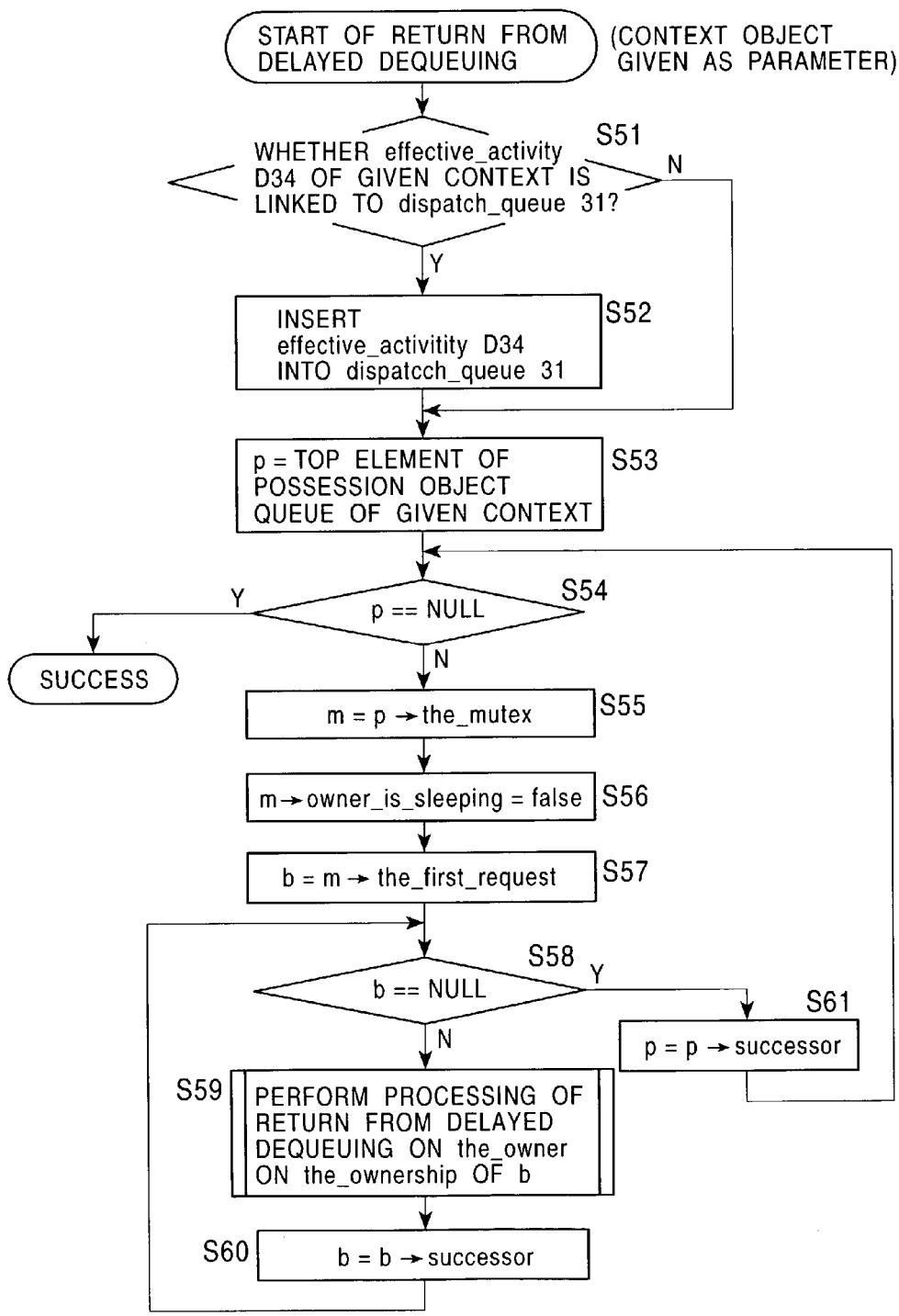
FIG. 8 is a flowchart showing the process of return from delayed dequeuing.
Figure 9:
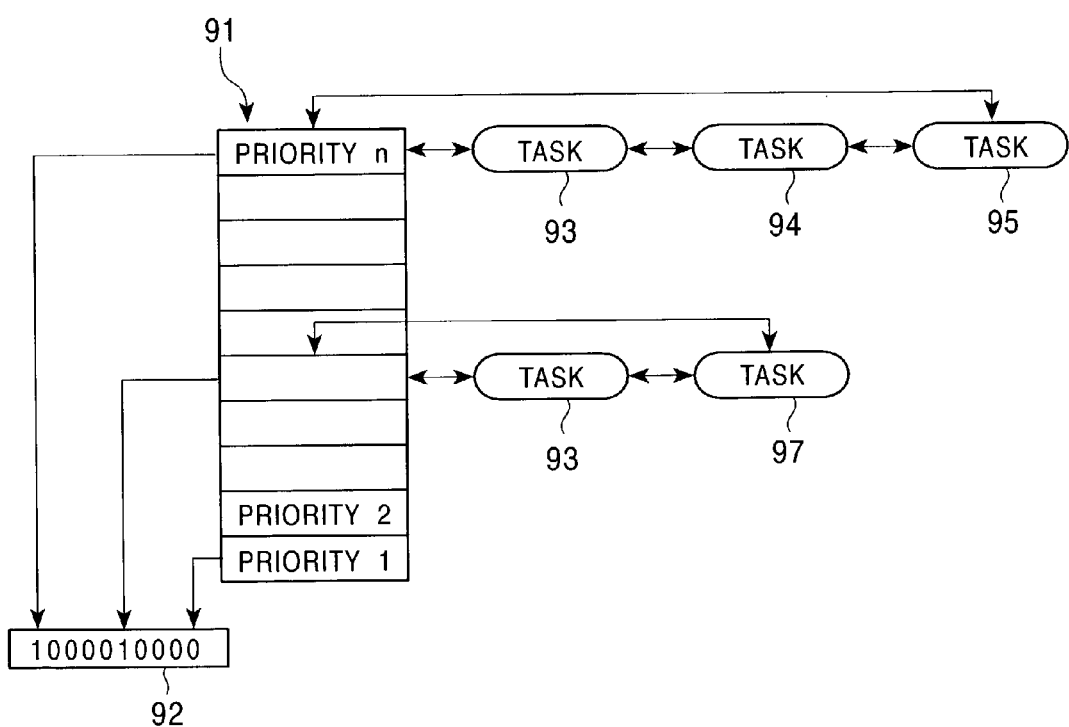
FIG. 9 is a block diagram showing the representation of a dispatch queue in static priority scheduling.

FIG. 8 is a flowchart showing the process of return from the delayed dequeuing. The context object is given as a parameter.

In FIG. 8, in step S51, the process determines whether the presently effective correlation D34 (effective_activity) of the given "context 34" is linked to "dispatch_queue" 31.

When the presently effective correlation D34 (effective_activity) of the given "context 34" is linked to "dispatch_queue" 31, the process proceeds to step S52. In step S52, the presently effective correlation D34 (effective_activity) is inserted into "dispatch_queue" 31.

In step S53, the setting of p=the top element of the possession object queue of the given context 34 is performed. If the process has determined in step S51 that the presently effective correlation D34 (effective_activity) of the given "context 34" is not linked to "dispatch_queue" 31, the process directly proceeds to step S53.

In step S54, the process determines whether p=NULL. In step S54, if it is determined that p=NULL, the delayed dequeuing directly becomes a success. If p≠NULL, the process proceeds to step S55. In step S55, the mutex is set with m=p. In step S56, the process sets the sleeping state (owner_is_sleeping) of the owner of m to be false. In step S57, the correlation D37 (the_first_request) is set with b=m.

In step S58, the process determines whether b=NULL. If b=NULL in step S58, the process proceeds to step S61. In step S61, the process returns to step S54 for the successor of p=p.

If b=NULL in step S58, the process proceeds to step S59. In step S59, the process performs processing for return from delayed dequeuing on the owner (the_owner) on the ownership (the_ownership) of b. In step S60, the process returns to step S58 for the successor of b=b.

As described above, the achievable processor-use factor can be increased by employing two techniques: First, the EDF scheduling; and Second, the priority inheritance protocol. Both have a problem in that the overhead increases.

Accordingly, the technique proposed in the first embodiment has an advantage in which, by enabling the following optimization, the above problem can be solved.

First, priority is inherited without operating a data configuration representing a dispatch queue. This can avoid a problem of high overhead caused by the operation of the dispatch queue of the EDF scheduler. Simultaneously, the overhead of the priority inheritance protocol can be reduced.

Second, the number of times the queue operation required for transition to or return from the mutex awaiting state is performed can be reduced. This can relax a problem of high overhead caused by the operation of a dispatch queue of the EDF scheduler.

Third, the operation of the mutex awaiting queue is performed without considering priority. This can eliminate one of factors causing the overhead of the priority inheritance protocol.

Therefore, a higher processor-use efficiency can be achieved, while suppressing an increase in an overhead caused by the employment of EDF scheduling and the priority inheritance protocol. Also, by combining this technique with a power-saving real-time scheduling technique, a higher power-consumption reducing effect can be obtained.

Second Embodiment

A second embodiment of the present invention is described below.

A task management system according to the second embodiment of the present invention can efficiently realize priority inheritance, for example, when a client task requests a service from a server task.

In the second embodiment, as shown in FIG. 1, in order to simplify the process of starting or stopping a server task and a priority inheritance process, information that must be inherited is separated from other information, the information is treated as one to be inserted into or deleted from "dispatch_queue" 1. Specifically, one task is represented by "activity" 2 that is a data configuration retaining priority, and "context" 4 that is a data configuration retaining other information. "Activity" 2 is treated as one to be inserted into or deleted from "dispatch_queue" 1. Also, it is assumed that, unlike an ordinary task, only the context 4 is generated when the server task is generated.

The division enables the starting or stopping the server task and priority inheritance by only changing the correspondence between "context" 4 and "activity" 2.

FIG. 2 shows that the correspondence changes before and after the server task is started. FIGS. 10A and 10B show changes in the relationship between context and activity. FIGS. 2A and 2B show that the correspondence between context and activity changes before and after the server task is started in circumstances from the unstarted condition shown in FIG. 10A to the started condition shown in FIG. 2B. Here, this data configuration is called "the_dispatch_queue" because one to be queued is activity, and non-executable activities are queued, as described later.

As is clear from FIGS. 10A and 10B, despite the condition that a client task 102 stops, "activity C" 104 remains in the same position, and only relationships among "activity C" 104 and "context S" 103, and "context C" 103 change.

Even when a plurality of clients request "a_service" 105, it is guaranteed that the priority of a server task is set to be higher by priority inheritance unless the execution of the server task is interrupted. Accordingly, there is no possibility that a dispatcher selects context corresponding to the clients for dispatch. Thus, it is not necessary to eliminate "activity C" 104, which is correlated with the client task 102, from a "the_dispatch_queue" 101.

Also, processing equivalent to moving is performed by simply performing an operation in which presently effective correlation D101 (effective_context) in the unstarted condition in FIG. 10A that indicates one pointer from "activity C" 104 to "context C" 103 is updated to presently effective correlation D104 (effective_context) in the started condition in FIG. 10B that indicates one pointer from "activity C" 104 to "context S" 106.

The technique of the related art deletes "activity C" 104 from "the_dispatch_queue" 101, while the technique of the second embodiment controls "activity C" 104 to remain in "the_dispatch_queue" 101. This omission in this process can be performed by delayed dequeuing (described later).

Determination of change in the correspondence of both is performed by "context S" 106, which is correlated with server context of "a_service" 105, is performed by "context S" 106, and "context S" 106 recognizes the change in the correspondence.

In FIG. 10A, "context C" 104 performs presently effective correlation D101 (effective_context) on "context C" 103.

"A_service" 105 performs "server_context" correlation D102 for "context" S106.

In FIG. 10B, "activity" 104 performs the presently effective correlation D104 (effective_context) for "context S" 106.

"A_service" 105 performs correlation D103 on recording of the present service 105 (in_service) for "context C" 103.

The service 105 (in_service) performs correlation D102 on server context (server_context) for "context S" 106.

What becomes a problem in this case is that the condition that unless the execution of the server task is interrupted is not satisfied. For example, a case in which the server task stops due to awaiting of input processing corresponds to it.

In this case, "activity C" 104 of the client task 102 correlated with this task is deleted from "the_dispatch_queue" 101.

As a result, as FIG. 11 (described later), there is a possibility that "activity C2" 117 of a client task 115 which must originally stop on completion of service may be selected for dispatch.

To solve this problem, after being dispatched, the client task 102 that is awaiting completion of service performs inspection about whether the execution of the service (a_service) 105 is completed. If the execution of the service (a_service) 105 is not completed, "activity C" 104 corresponding to the client task 102 is deleted from "the_dispatch_queue" 101. Here, to delay the processing of eliminating "activity C" 104 from "the_dispatch_queue" 101 is called "delayed dequeuing".

Figure 11:
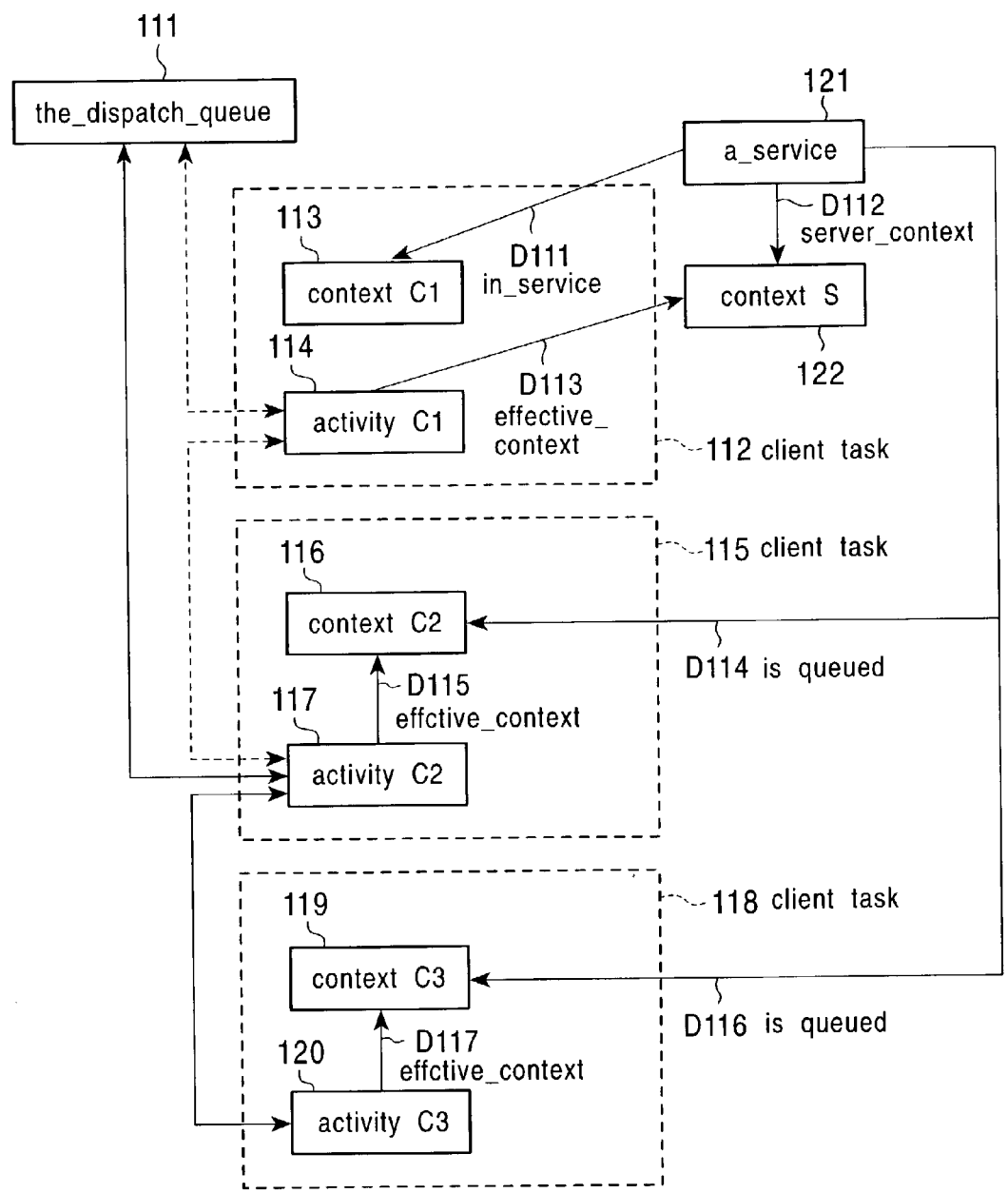
FIG. 11 is a block diagram showing the execution of incorrect activity due to the sleeping of a server task.

FIG. 11 shows the inappropriate execution of activity due to sleeping of the server task.

In FIG. 11, when a sever task stops during service, "activity C1" 114 is deleted from "the_dispatch queue" 111.

This causes a possibility that "activity C1" 114, which has lower priority and cannot be executed, may be selected.

At this time, "context C2" 116 is in the state of continuing processing after the end of service.

Accordingly, despite the fact that the service has not ended, the service operates as if it ended.

In FIG. 11, "context C1" 113 of a client task 112 performs correlation D111 (in_service) on recording of the present service for a service 121 (a_service).

The service 121 (a_service) performs correlation D112 on server context (server_context) for "context S" 122.

"Activity C1" 114 of the client task 112 performs the presently effective correlation D113 (effective_context) for "context S" 122.

The service 121 (a_service) performs correlation D114 (is_queued) on queuing for "context C2" 116 of the client task 115.

"Activity C2" 117 of the client task 115 performs the presently effective correlation D115 (effective_context) for "context C2" 116.

The service 121 (a_service) performs correlation D116 on queuing (is_queued) for "context C3" 119 of a client task 118.

"Activity C3" 120 of a client task 118 performs the presently effective correlation D117 (effective_context) for "context C3" 119.

Figure 12:
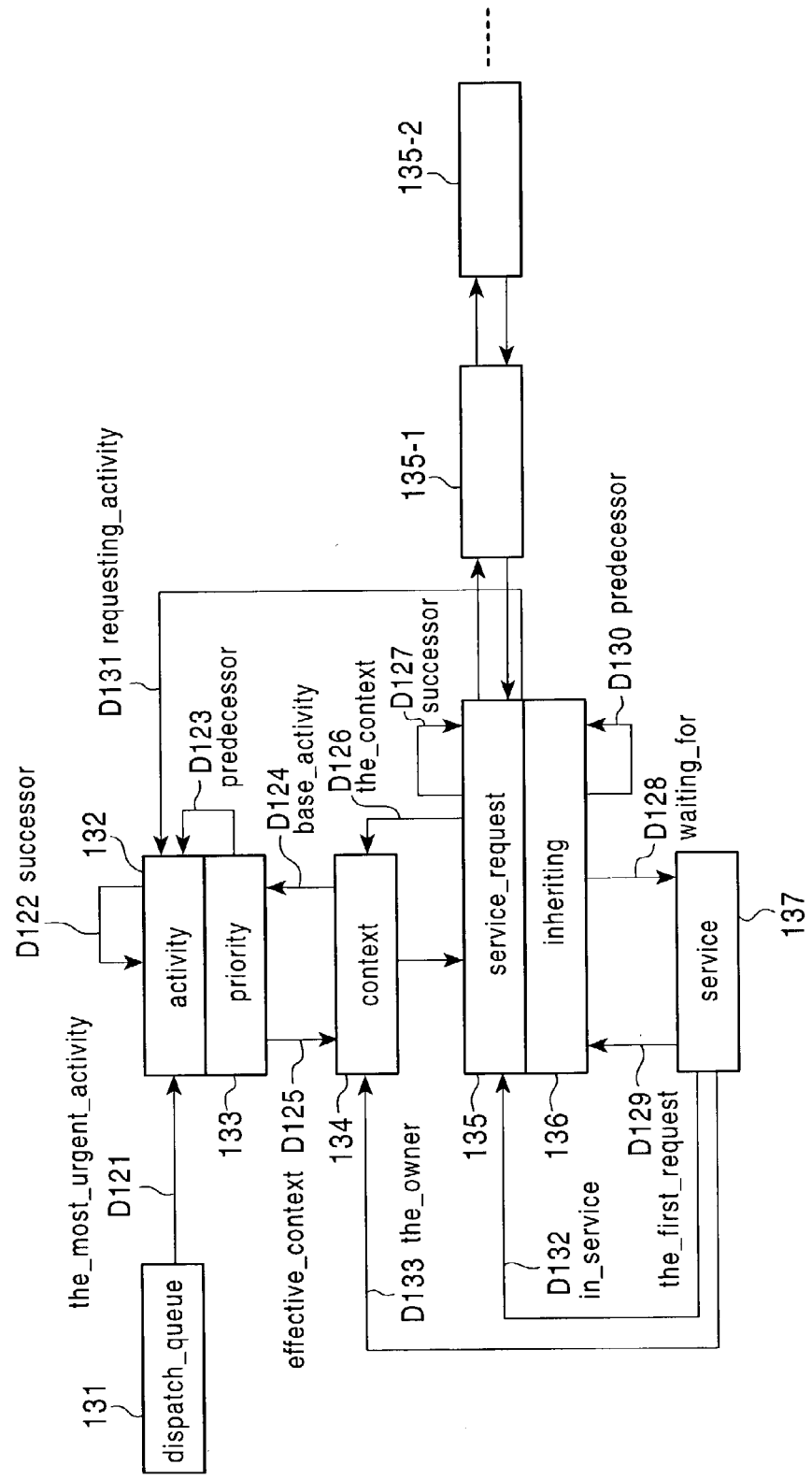
FIG. 12 is a block diagram showing classes related to the realization of a service request mechanism and relationships among the classes.

FIG. 12 shows classes related to the realization of a service request mechanism and shows relationships among the classes.

In FIG. 12, "dispatch_queue" 131, "activity" 132, and "context" 134 are as described above.

Two other classes are described below. Each of the two classes has the following functions.

First, a service class 137 (service) is described.

In general, the service class 137 (service) represents a procedure that can be called from a different address space. One server is correlated with each service. "Context" 134 of the service class 137 (service) can be accessed by using a pointer based on correlation D133 on server context (server_context). The service class 137 (service) is generated by an application program.

Second, a service request class 135 (service_request) is described.

The service request class 135 (service_request) represents a service request by a task. The service request class 135 (service_request) continues to exist until a server task completes provision of service after a server task requests the service.

During processing of the service request, when priority inheritance to the server task occurs, an attribute inheriting 136 is true, and is false in other cases.

The service request class 135 (service_request) is generated by context of a client task.

Next, relationships between objects are described.

These classes do not independently operate, but retain, for example, "the_first_request" as correlation of reference to an object in another class, as shown in FIG. 12. The references shown in FIG. 12 are required for forming the following data configuration.

First, a service awaiting queue is described.

In a case in which the server task is processing a request when a service is requested, that is, in a case in which, for correlation on recording of the present service, a pointer to a service request object (service_request) is stored, the service must be awaited until the execution of the server task is completed. The service awaiting queue is data configuration for recording such a request for the service that must be awaited. The service awaiting queue is formed as a bidirectional link list in which the service object 135 (service_request) is included as an element.

Correlation D129 on the first request (the_first_request) of the service object 137 (service) represents the top element.

Correlation D127 (successor) of the service request object 135 (service_request) on the rear part of the array is a pointer to succeeding elements 135-1, 135-2, etc. Correlation D130 (predecessor) of the service request object 135 (service_request) on the front part of the array is a pointer to preceding elements 135-1, 135-2, etc. The correlation D130 (predecessor) of the start element 135 and the correlation D127 (successor) of the end element 135-n each retain a special pointer value that any object does not represent. When packaging using a language such as C or C++, a null pointer can be used therefor.

In FIG. 12, "dispatch_queue" 131 performs the most urgent correlation D121 (the_most_urgent_activity) based on priority for "activity" 132.

"Activity" 132 performs, for itself, correlation D122 on the rear part of the array (successor). "Priority" 133 performs correlation D123 on the front part of the array (predecessor) for "activity" 132.

"Context" 134 performs, for "activity" 132, original correlation D124 (base_activity) that is not related to "priority" 133. "Activity" 132 performs, for "context" 134, the presently effective correlation D125 (effective_context).

The service request class 135 (service_request) performs context correlation D126 (the_context) for "context" 134.

The service class 137 (service) performs first-request correlation D129 (the_first_request) for the service request class 135 (service_request).

The service request class 135 (service_request) performs "waiting_for" correlation D128 for the service class 137 (service).

The service request class 135 (service_request) performs correlation D127 (successor) on the rear part of the array for the elements 135-1, 135-2, etc. The service request class 135 (service_request) performs correlation D130 on the front part of the array for the elements 135-1, 135-2, etc.

The service request class 135 (service_request) performs "requesting_activity" correlation D131 for "activity" 132.

The service class 137 (service) performs present-service-recording correlation D132 for the service request class 135 (service_request).

The service class 137 (service) performs "server_context" correlation D133 for "context" 134.

Next, a service request procedure and a server process procedure are described below.

Figure 13:
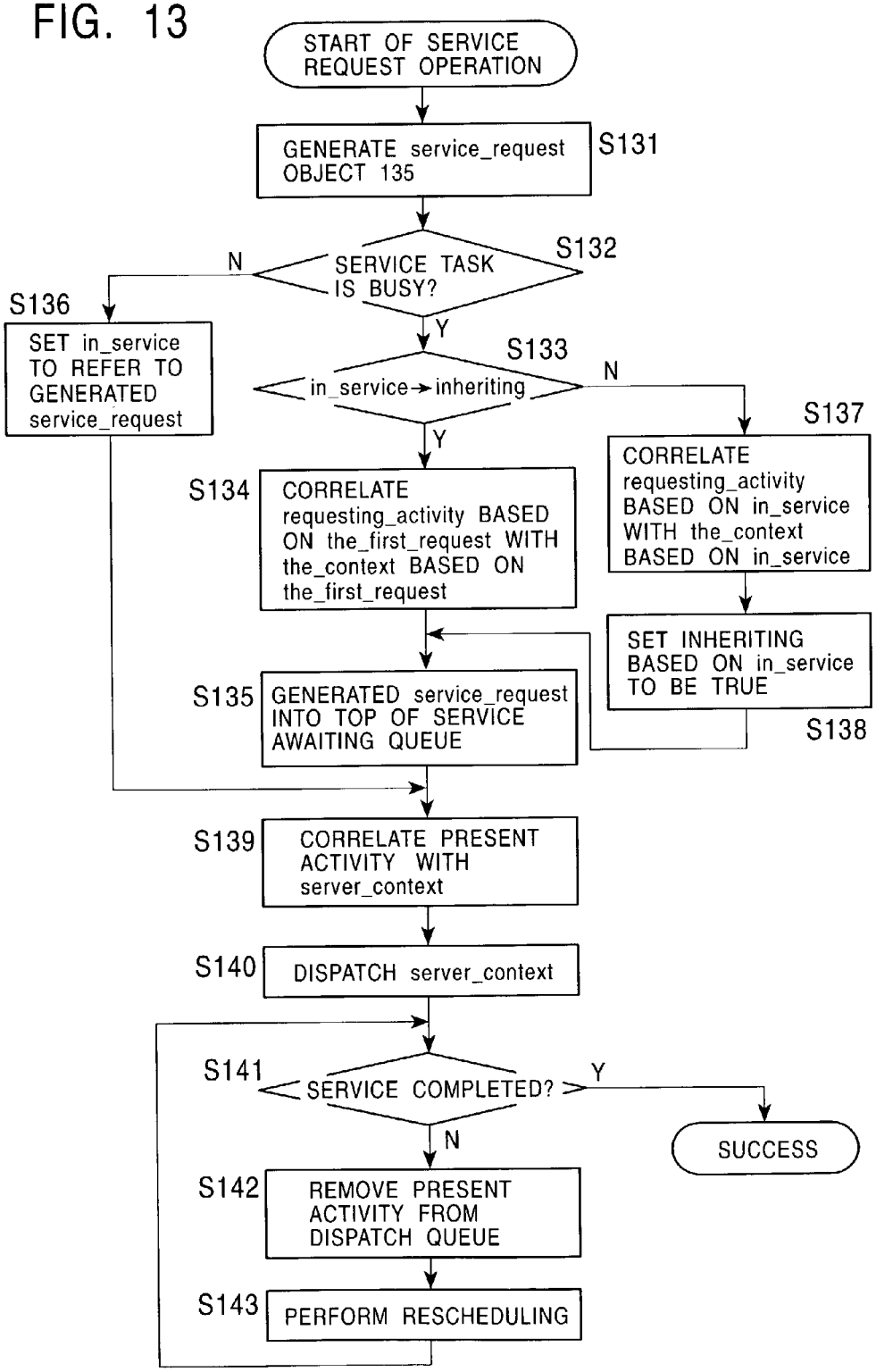
FIG. 13 is a flowchart showing the process of a service request operation.

FIG. 13 is a flowchart showing the process of the service request procedure. The service request procedure shown in FIG. 13 shows the operation of the service class 137 (service). The steps in FIG. 13 correspond to the processes described using FIG. 12.

In FIG. 13, in step S131, the service request object 135 (service_request) is generated. In step S132, the process determines whether the server task is busy. If the server task is busy, the process proceeds to step S133. In step S133, based on the attribute inheriting 136 caused by the correlation D132 on the recording of the present service (in_service), the process determines whether priority inheritance to the server task has occurred in the processing of the service request.

If it is determined in step S133 that the priority inheritance to the server task has occurred, the process proceeds to step S134. In step S134, the correlation D131 on "requesting_activity" based on the correlation D129 (the_first_request) is correlated with the correlation D126 (the_context) on context based on the correlation D129 (the_first_request).

In step S135, the generated service request object 135 (service_request) is inserted in the start of the service awaiting queue.

If it is determined in step S132 that the server task is not busy, the process proceeds to step S136. In step S136, the correlation D132 (in_service) on the recording of the present service is set to refer to the generated service request object 135 (service_request).

If it is determined in step S133 that the priority inheritance to the server task has not occurred, the process proceeds to step S137. In step S137, the correlation D131 on "requesting_activity" based on the correlation D132 on the recording of the present service is correlated with the correlation D126 (the_context) based on the correlation D132 on the recording of the present service.

Specifically, the activity at the service request is correlated with the client context in the present service.

In step S138, the attribute 36 (inheriting) based on the correlation D132 on the recording of the present service is set to be true in the processing of the service request in order to indicate that the priority inheritance to the server task has occurred.

In step S139, the correlation D133 performs correlation D133 between the present activity 132 and the server context (server_context). Specifically, the activity of the client at the start and the server context (service_request) are correlated with each other.

In step S140, the correlation D133 of the server context (server_context) is dispatched. At this time, the context of the client is retained.

In step S141, the process determines whether the service is completed. In step S141, on completion of the service request immediately becomes a success.

If it is determined in step S141 that the service is not completed, the process proceeds to step S142. In step S142, the present activity 132 is removed from "dispatch_queue" 131. Specifically, a process for correcting incorrect dispatch is performed. This process corresponds to removal of "activity C" 117 in the client task 115 (FIG. 11).

In step S143, the process performs rescheduling, and returns to step S141. The determination in step S141 and the processes in steps S142 and S143 are repeatedly performed. Specifically, processing is performed so that one that must originally be dispatched is dispatched.

Figure 14:
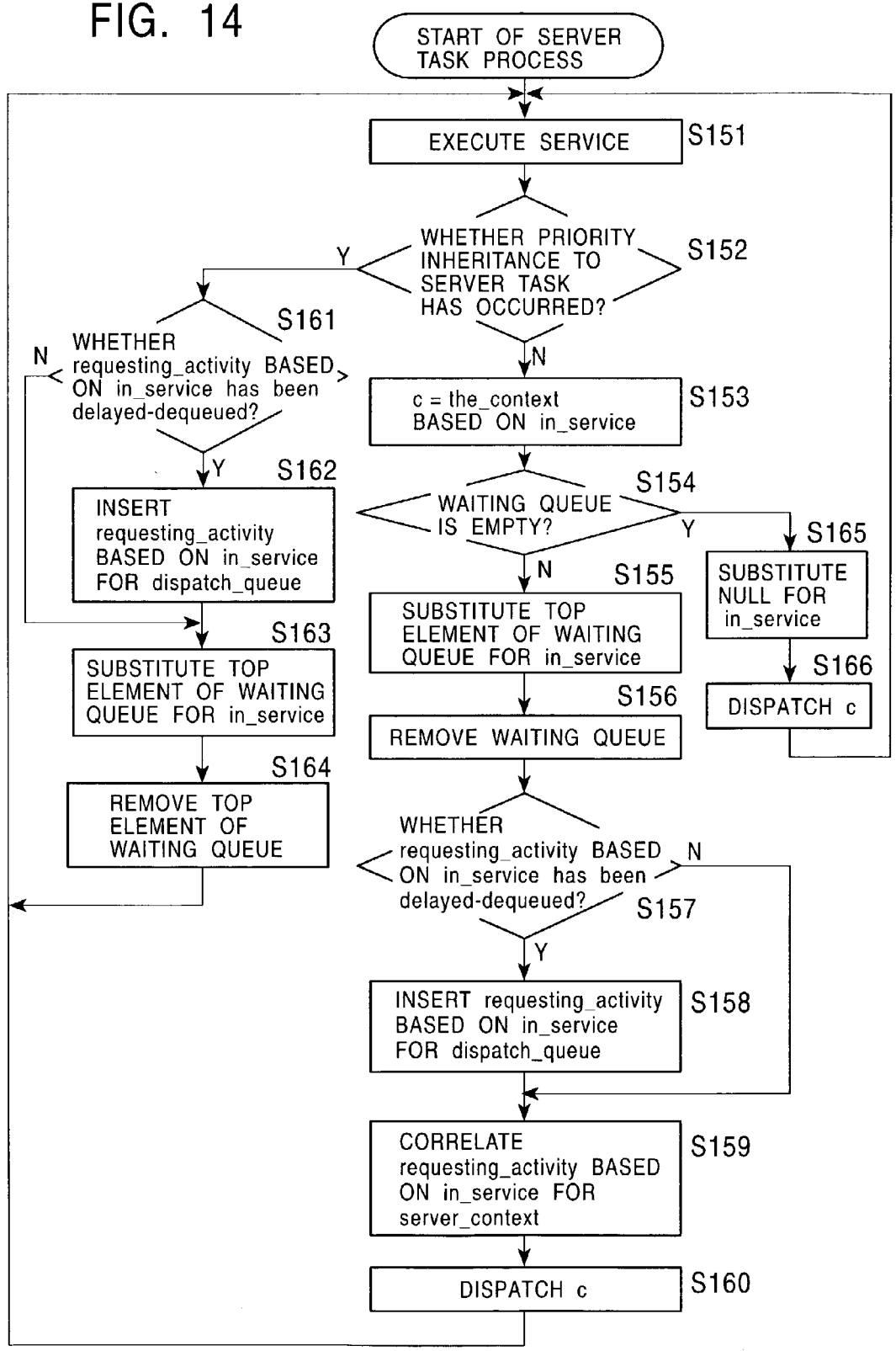
FIG. 14 is a flowchart showing a sever task process.

FIG. 14 is a flowchart showing the process of the server procedure. FIG. 14 shows the operation of the server context.

In FIG. 14, in step S151, the service is executed.

In step S152, based on the attribute inheriting 136 based on the correlation D132 (in_service) on the recording of the present service, the process determines whether the priority inheritance to the server task has occurred in the processing of the service request.

If it is determined in step S152 that the priority inheritance to the server task has not occurred, the process proceeds to step S153. In step S153, the process sets setting of c=the context correlation D126 (the_context) based on the correlation D132 (in_service) on the recording of the present service. Specifically, the process performs correlation for the context of the client that is providing the present service. In step S154, the process determines whether the waiting queue is empty.

If it is determined in step S154 that the waiting queue is not empty, the process proceeds to step S155. In step S155, the top element of the waiting queue is substituted for the correlation D132 (in_service) on the recording of the present service.

In step S156, the top element of the waiting queue is removed. In step S157, the process determines whether the correlation D131 (requesting_activity) based on the correlation D132 (in_service) on the recording of the present service has already been delayed-dequeued. Specifically, this is a process in a case in which delayed dequeuing is performed in the waiting queue.

If it is determined in step S157 that the delayed dequeuing has already been performed, the process proceeds to step S158. If it is determined in step S157 that the delayed dequeuing has not already been performed, the process proceeds to step S159.

In step S158, the correlation D131 (requesting_activity) based on the correlation D132 (in_service) on the recording of the present service is inserted into "dispatch_queue" 131.

In step S159, the correlation D131 (requesting_activity) based on the recording of the present service is correlated with the correlation D133 for the server context.

In step S160, c is dispatched, and the process returns to step S151. Steps S151 to S160 are repeatedly performed. Specifically, the previous processed by the correlation D132 (in_service) on the recording of the present service is dispatched. At this time, it is not necessary to dispatch the previous activity.

If it is determined in step S152 that the priority inheritance to the server task has occurred, the process proceeds to step S161. In step S161, the process determines whether the correlation D131 (requesting_activity) based on the correlation D132 (in_service) on the recording of the present service has already been delayed-dequeued.

If it is determined in step S161 that the delayed dequeuing has already been performed, the process proceeds to step S162. If it is determined in step S61 that the delayed dequeuing has not already been performed, the process proceeds to step S163.

In step S162, the correlation D131 (requesting_activity) based on the correlation D132 (in_service) on the recording of the present service is inserted into "dispatch queue".

Specifically, the previous activity has a lower priority than that of the present activity, and is correlated with the server context. Thus, it is not necessary to dispatch the previous activity.

In step S163, the top element of the waiting queue is substituted for the correlation D132 (in_service) on the recording of the present service. At this time, the correlation D132 (in_service) on the recording of the present service is set to indicate the top service request.

In step S164, the top element of the waiting queue is removed, and the process returns to step S151. Steps S151 to S160 are repeatedly performed. At this time, the server context should move with the activity correlated with the top service request.

If it is determined in step S154 that the waiting queue is empty, the process proceeds to step S165. In step S165, NULL is substituted for the correlation D132 (in_service) on the recording of the present service. At this time, the server is in the idling condition.

In step S166, c is dispatched, and the process returns to step S151. Steps S151 to S160 are repeatedly performed. When, in step S140 in FIG. 13, the correlation D133 of the server context is dispatched, c is stopped in the dispatched position.

As described above, in order to increase the system stability, it is preferable that, after dividing the system into a plurality of modules, the modules be executed in different address spaces.

In addition, in order to request a service from a module existing in a different address space, a mechanism is provided in which a server task executes the service in response to a service request of a client task.

In this case, packaging is frequently performed so that the server task can inherit the priority of a client task in order to perform processing, depending on the urgency of the client task.

Moreover, in order to achieve a processor-use factor, the use of a scheduler employing the EDF policy is effective. However, when the scheduler employing the EDF policy is used, an overhead that is caused by starting or stopping a task and by changing priority change tends to increase than the technique of the related art. This causes a problem in that the efficiency of a service request mechanism decreases.

Accordingly, by using the technique described in the second embodiment of the present invention to enable the following optimization, the high overhead of the EDF scheduling due to the operation of a dispatch queue can be avoided.

First, the server task is started or stopped without operating a data configuration representing a dispatch queue. This can avoid the high overhead of the EDF scheduling due to the operation of the dispatch queue.

Second, the server task can inherit the priority of the client task without operating a data configuration representing a dispatch queue. As a result, a highly stable system can be formed and a higher processor-use factor can be achieved, while suppressing an increase in an overhead caused by server task activation requiring the EDF scheduling and priority inheritance.

Also, by combining this technique with a power-saving scheduling technique, a higher power-consumption reducing effect can be obtained.

What is claimed is:

1. A task management system using a single processor to manage tasks, said task management system comprising:
   first data retaining means for retaining first data information related to scheduling of the managed tasks which is included in information on arbitrary tasks;
   second data retaining means for retaining second data information which is not recorded in said first data;
   a dispatch queue for selecting the highest priority task from among executable tasks;
   a mutex awaiting queue for recording a task waiting for an owner of a mutex which is a mutual exclusion of tasks; and
   a possession object queue for recording said mutex possessed by said tasks,
      wherein information on one task is divisionally managed by said first data and said second data,
      wherein said first data is used as data to be inserted into or deleted from said dispatch queue, and
      when priority inheritance from one task to another task is performed using said dispatch queue, said mutex awaiting queue and said possession object queue, only the correspondence between said first data and said second data is changed,
   wherein the mutex awaiting queue is formed as a bidirectional link list comprising an acquirement request class as an element.

2. A task management system according to claim 1, when task execution must be stopped based on one condition variable for performing the priority inheritance, an operation for said dispatch queue is delayed until the time said task execution must be stopped based on another condition variable without immediately performing the operation for said dispatch queue.

3. A task management system using a single processor to manage tasks, said task management system comprising:
   first data retaining means for retaining first data information related to scheduling of the managed tasks which is included in information on arbitrary tasks;
   second data retaining means for retaining second data information which is not recorded in said first data;
   a dispatch queue for selecting the highest priority task from among executable tasks;
   a server task in one module which is started by a service request from a task operating in another module and which processes said service request;
   a client task for issuing a service request to said server task; and
   a service awaiting queue for recording a service request waiting for processing,
      wherein information on one task is divisionally managed by said first data and said second data,
      wherein said first data is used as data to be inserted into or deleted from said dispatch queue,
      wherein said server task is a particular task having no first data thereof,
      wherein when said server task and said client task are started or terminated, and when priority inheritance for said server task and said client task is performed, using said dispatch queue and said service awaiting queue, only the correspondence between said first data and said second data is changed,
   wherein the inutex awaiting queue is formed as a bidirectional link list comprising an acquirement request class as an element.

4. A task management system according to claim 3, when said client task stops to await the service request from said server task, an operation for said dispatch queue is delayed until the time said task management system finds that said client task is mistakenly selected from said dispatch queue without immediately deleting said client task from said dispatch queue.

* * * * *